(12) United States Patent
Zhang et al.

(10) Patent No.: US 10,443,749 B2
(45) Date of Patent: Oct. 15, 2019

(54) SLAM-SHUT SAFETY DEVICE WITH AN OPERATIONAL FEEDBACK SYSTEM

(71) Applicant: FISHER JEON GAS EQUIPMENT (CHENGDU) CO., LTD., Chengdu (CN)

(72) Inventors: Jing Zhang, Sichuan (CN); Guolei Fan, Chengdu (CN); Nianchun Liu, Sichuan (CN)

(73) Assignee: FISHER JEON GAS EQUIPMENT (CHENGDU) CO., LTD., Chengdu (CN)

( * ) Notice: Subject to any disclaimer, the term of this patent is extended or adjusted under 35 U.S.C. 154(b) by 0 days.

(21) Appl. No.: 15/957,545

(22) Filed: Apr. 19, 2018

(65) Prior Publication Data

US 2019/0186646 A1 Jun. 20, 2019

(30) Foreign Application Priority Data

Dec. 20, 2017 (CN) .......................... 2017 1 1385610
Dec. 20, 2017 (CN) ..................... 2017 2 1798499 U (51) Int. Cl.
*F16K 17/04* (2006.01)
*F16K 37/00* (2006.01)
*F16K 17/32* (2006.01)

(52) U.S. Cl.
CPC .............. *F16K 17/04* (2013.01); *F16K 17/32* (2013.01); *F16K 37/0033* (2013.01); *F16K 37/0041* (2013.01)

(58) Field of Classification Search
CPC ...... F16K 17/04; F16K 17/32; F16K 37/0033; F16K 37/0041
See application file for complete search history.

(56) References Cited

U.S. PATENT DOCUMENTS

| 4,134,421 A | 1/1979 | Cameron |
| 8,225,812 B2 | 7/2012 | Faillat et al. |

(Continued)

FOREIGN PATENT DOCUMENTS

| CN | 201973347 U | 9/2011 |
| CN | 102628518 A | 8/2012 |

(Continued)

OTHER PUBLICATIONS

Instruction Manual for MKF19X-AK / GKF19X_AK, Secatec electronic GMBH, Jan. 2017.

(Continued)

*Primary Examiner* — P. Macade Nichols
(74) *Attorney, Agent, or Firm* — Marshall, Gerstein & Borun LLP (57) ABSTRACT

An assembly for and part of a slam-shut safety device. The assembly includes a reset pin and a valve disc operatively connected to the reset pin, the reset pin and the valve disc being movable between a first position, in which the valve disc is adapted to be spaced from a slam-shut valve seat of the slam-shut safety device, and a second position, in which the valve disc is adapted to engage the slam-shut valve seat of the slam-shut safety device. The assembly also includes a reset pin assembly including a reset rod operatively connected to the reset pin, and a reset sleeve arranged to support an end of the reset rod. The assembly further includes a feedback system arranged proximate the reset pin assembly and configured to provide data indicative of whether the reset pin and the valve disc are in the first position or the second position.

20 Claims, 5 Drawing Sheets

(56) References Cited

U.S. PATENT DOCUMENTS

| | | |
|---|---|---|
| 9,086,158 B2 * | 7/2015 | Sanders ................ F16K 17/00 |
| 9,366,349 B2 | 6/2016 | Sanders et al. |
| 9,593,781 B2 | 3/2017 | Cojocaru et al. |
| 9,759,342 B2 | 9/2017 | Gota et al. |
| 2004/0149947 A1 | 8/2004 | Grill |
| 2012/0018654 A1 | 1/2012 | Wennberg et al. |
| 2017/0062168 A1 | 3/2017 | Amirthasamy et al. |

FOREIGN PATENT DOCUMENTS

| | | |
|---|---|---|
| CN | 103697219 A | 4/2014 |
| CN | 105485383 A | 4/2016 |
| CN | 105610058 A | 5/2016 |
| CN | 205207863 U | 5/2016 |

OTHER PUBLICATIONS

"Isolation Switching Amplifiers," Hans Turck GmbH & Co. 2015.
International Search Report received for PCT/IB2018/001510, dated Apr. 28, 2019.
Written Opinion received for PCT/IB2018/001510, dated Apr. 28, 2019.

* cited by examiner

SLAM-SHUT SAFETY DEVICE WITH AN OPERATIONAL FEEDBACK SYSTEM

FIELD OF THE DISCLOSURE

The present disclosure generally relates to slam-shut safety devices and, more particularly, to a slam-shut safety device having a feedback system that allows an operator of the slam-shut safety device to easily but safely monitor the operational status of that slam-shut safety device.

BACKGROUND

Gas distribution systems, such as systems used to distribute natural gas, typically transport gas from a producer to a consumer along a series of pipes and through a series of valves. Each gas distribution system may include one or more regulator valves that control the pressure of the gas within the distribution system. Normally, the gas is transmitted at a high pressure through the system. However, the pressure of the gas must be reduced prior to final distribution to the consumers. This pressure reduction is typically accomplished at pressure reducing stations within local networks.

Typically, these pressure reducing stations include one or more pressure regulating valves and some sort of safety device to shut off the flow of gas should the pressure regulating valve fail. Most commonly, slam-shut safety valves are used for this purpose. For example, U.S. Pat. No. 4,134,421 discloses a slam-shut safety valve that provides overpressure protection in a pipeline. Another example of a slam-shut safety valve is disclosed in U.S. Pat. No. 8,225,812. The slam-shut safety valve is generally disposed upstream of the pressure regulating valve so that the slam-shut valve may prevent gas from reaching the pressure regulating valve in the event of the pressure regulating valve has failed. The slam-shut safety valve monitors gas pressure downstream of the pressure regulating valve for maximum and minimum pressure tolerances. If the downstream pressure exceeds either the maximum or minimum tolerance, the slam-shut safety valve closes, cutting off the flow of gas to the pressure regulating valve and preventing an uncontrolled leak of gas due to the pressure regulating valve failure.

SUMMARY

One aspect of the present disclosure includes an assembly for a slam-shut safety device. The assembly includes a reset pin and a valve disc operatively connected to the reset pin, the reset pin and the valve disc being movable between a first position, in which the valve disc is adapted to be spaced from a slam-shut valve seat of the slam-shut safety device, and a second position, in which the valve disc is adapted to engage the slam-shut valve seat of the slam-shut safety device. The assembly also includes a reset pin assembly including a reset rod operatively connected to the reset pin, and a reset sleeve arranged to support an end of the reset rod. The assembly further includes a feedback system arranged proximate the reset pin assembly and configured to provide data indicative of whether the reset pin and the valve disc are in the first position or the second position. The feedback system includes a magnet carried by the reset rod, and a magnetically-responsive switch arranged proximate the reset sleeve such that the magnetically-responsive switch detects the magnet when the reset pin and the valve disc are in the first position but does not detect the magnet when the reset pin and the valve disc are in the second position.

Another aspect of the present disclosure includes an assembly for a slam-shut safety device. The assembly includes a reset pin and a valve disc operatively connected to the reset pin, the reset pin and the valve disc being movable between a first position, in which the valve disc is adapted to be spaced from a slam-shut valve seat of the slam-shut safety device, and a second position, in which the valve disc is adapted to engage the slam-shut valve seat of the slam-shut safety device. The assembly also includes a reset pin assembly including a reset rod operatively connected to the reset pin, and a reset sleeve arranged to support an end of the reset rod. The assembly further includes a feedback system arranged proximate the reset pin assembly and configured to provide data indicative of whether the reset pin and the valve disc are in the first position or the second position. The feedback system includes a magnet and a magnetically-responsive switch. The magnet is coupled to the reset pin proximate to the end of the reset pin, the magnet being movably disposed in the reset sleeve between a third position when the reset pin and the valve disc are in the first position and a fourth position when the reset pin and the valve disc are in the second position. The magnetically-responsive switch is arranged proximate to the reset sleeve. Movement of the magnet from the third position to the fourth position actuates the magnetically-responsive switch.

Another aspect of the present disclosure includes a slam-shut safety device. The slam-shut safety device includes a valve body, a reset pin and a valve disc. The valve body has an inlet, an outlet, and defines a flow path extending between the inlet and the outlet. The valve body includes a slam-shut valve seat surrounding an orifice disposed between the inlet and the outlet. The valve disc is disposed within the valve body and is shiftable along a slam-shut axis between an open first position in which the valve disc is spaced away from the slam-shut valve seat, and a closed second position in which the valve disc is seated against the slam-shut valve seat. The reset pin is operatively coupled to the valve disc and shiftable along the slam-shut axis relative to the valve body between an un-tripped position placing the valve disc in the open first position and a tripped position placing the valve disc in the closed second position, the reset pin arranged to respond to an actuator of the slam-shut safety device to shift the reset pin from the un-tripped position toward the tripped position. The slam-shut safety device also includes a reset pin assembly including a reset rod and a reset sleeve, the reset rod operatively connected to the reset pin, and the reset sleeve arranged to support an end of the reset rod. The slam-shut safety device further includes a feedback system arranged proximate the reset pin assembly and configured to provide data indicative of whether the reset pin and the valve disc are in the first position or the second position. The feedback system includes a magnet carried by the reset rod, and a magnetically-responsive switch arranged proximate the reset sleeve such that the magnetically-responsive switch detects the magnet when the reset pin and the valve disc are in the first position but does not detect the magnet when the reset pin and the valve disc are in the second position.

Any of the above aspects of the disclosure may include any one or more of the following preferred forms.

In one preferred form, the feedback system further includes a display device communicatively coupled to the magnetically-responsive switch, the display device configured to provide the data indicative of whether the reset pin and the valve disc are in the first position or the second position.

In another preferred form, the feedback system further includes an intrinsically safe barrier communicatively coupled to the magnetically-responsive switch, the intrinsically safe barrier configured to provide the data indicative of whether the reset pin and the valve disc are in the first position or the second position. The intrinsically safe barrier may be configured to emit light when the reset pin and the valve disc are in the first position, but not emit light when the reset pin and the valve disc are in the second position.

In another preferred form, a fastener secures the magnet to the reset rod proximate the end of the reset rod.

In another preferred form, when the reset pin and the valve disc are in the first position, the magnet and the magnetically-responsive switch are separated by a first distance, and when the reset pin and the valve disc are in the second position, the magnet and the magnetically-responsive switch are separated by a second distance less than the first distance.

In another preferred form, the magnetically-responsive switch includes a reed switch. The reed switch may include a first reed, a second reed movable relative to the first reed responsive to movement of the magnet, and an electronic circuit that is completed or interrupted based upon the position of the second reed. When the reset pin and the valve disc are in the first position, the second reed may be spaced from the first reed, thereby interrupting the electrical circuit. When the reset pin and the valve disc move from the first position to the second position, the magnetic field of the magnet may cause the flexible reed to move toward and contact the second reed, thereby completing the electrical circuit.

In another preferred form, the reset pin and the reset rod are movably disposed in first and second bores, respectively, of a slam-shut body of the slam-shut safety device, and the magnetically-responsive switch includes a housing coupled to the slam-shut body proximate the end of the reset rod.

Additional optional aspects, arrangements, examples, and features are disclosed, which may be arranged in any functionally appropriate manner, either alone or in any functionally viable combination, consistent with the teachings of the disclosure. Other aspects and advantages will become apparent upon consideration of the following detailed description.

DETAILED DESCRIPTION

The present disclosure is directed to a slam-shut safety device that is configured to provide a safety shutoff capability and, at the same time, is equipped with a feedback system that is configured to provide an operator of the safety device with data indicative of the operational status of the slam-shut safety device. The feedback system may, for example, provide the operator with a visual and/or tactile indication (e.g., a light or other electrical signal) that the slam-shut safety device is on, i.e., is providing safety shutoff, or is off, i.e., is not providing safety shutoff. As such, the operator of the slam-shut safety device can easily but safely determine the operational status of the slam-shut safety device.

FIGS. 1-6 illustrate one example a slam-shut safety device 100 constructed in accordance with the teachings of the present disclosure. As discussed above, the slam-shut safety device 100 is configured for attachment to a main regulator (not shown) in a gas distribution system to provide a safety shutoff capability in the event the main regulator fails. The slam-shut safety device 100 in this example generally includes a valve portion 104 (see FIGS. 3 and 4), a slam-shut portion 108 coupled to the valve portion 104, and an actuator 112 coupled to the slam-shut portion 108. However, in other examples, the slam-shut safety device 100 can include more, less, or different components. As an example, the slam-shut safety device 100 may not include valve portion 104 or may include a different valve portion 104.

Figure 1:
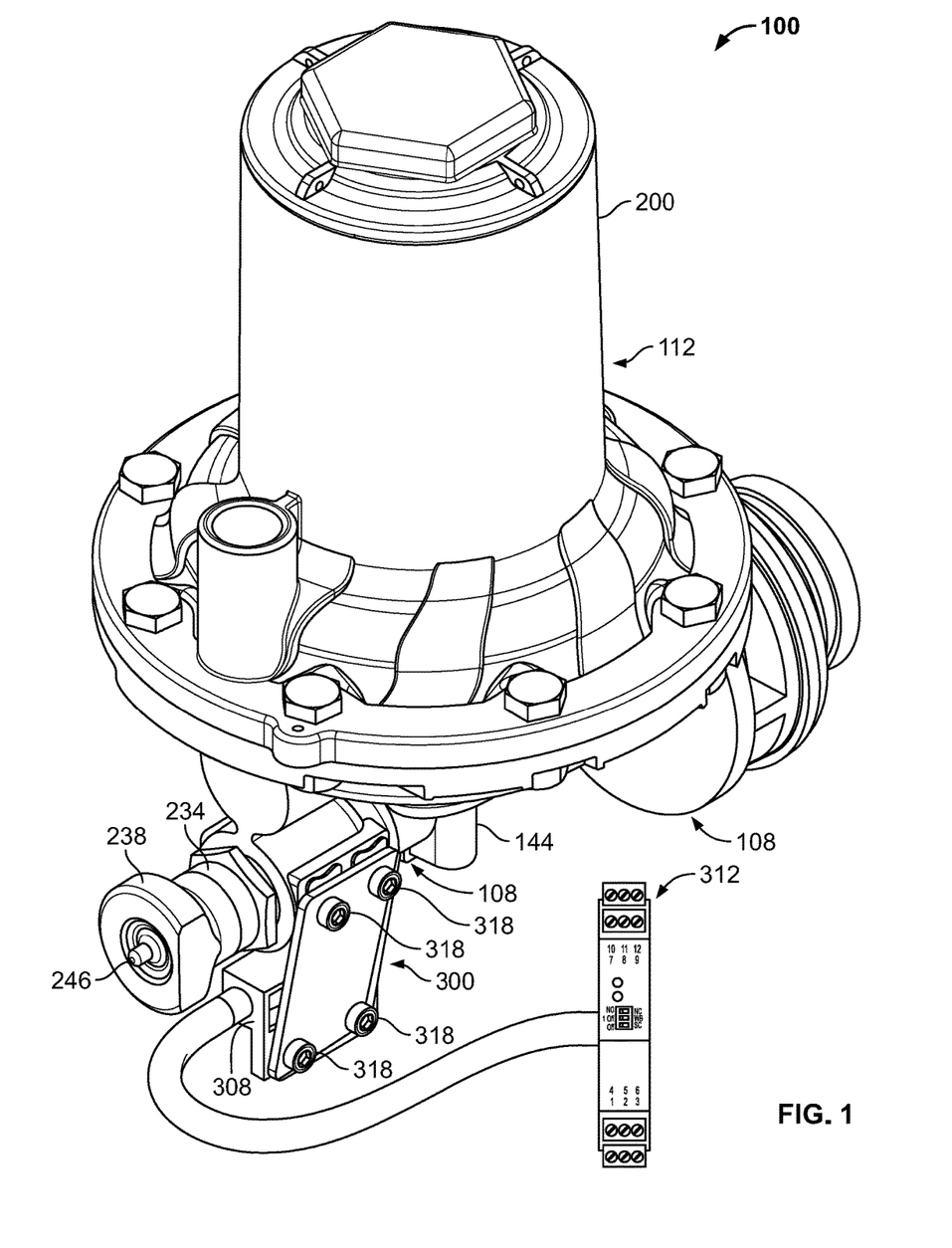
FIG. 1 is a first perspective view of a slam-shut safety device constructed in accordance with teachings of the present disclosure, the slam-shut safety device including a feedback system that allows an operator of the slam-shut safety device to easily but safely monitor the operational status of that slam-shut safety device.
Figure 2:
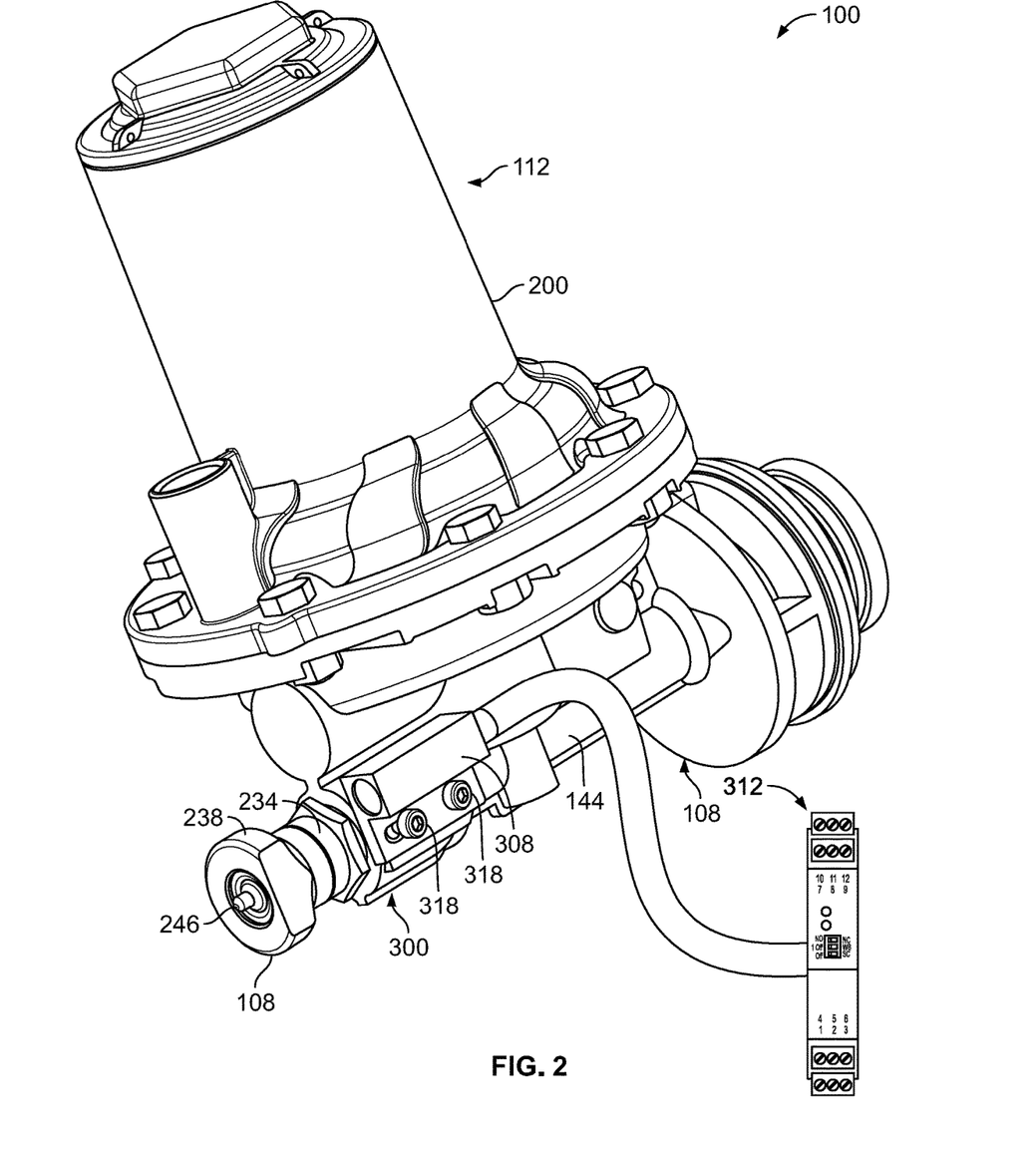
FIG. 2 is a second perspective view of the slam-shut safety device of FIG. 1.
Figure 3:
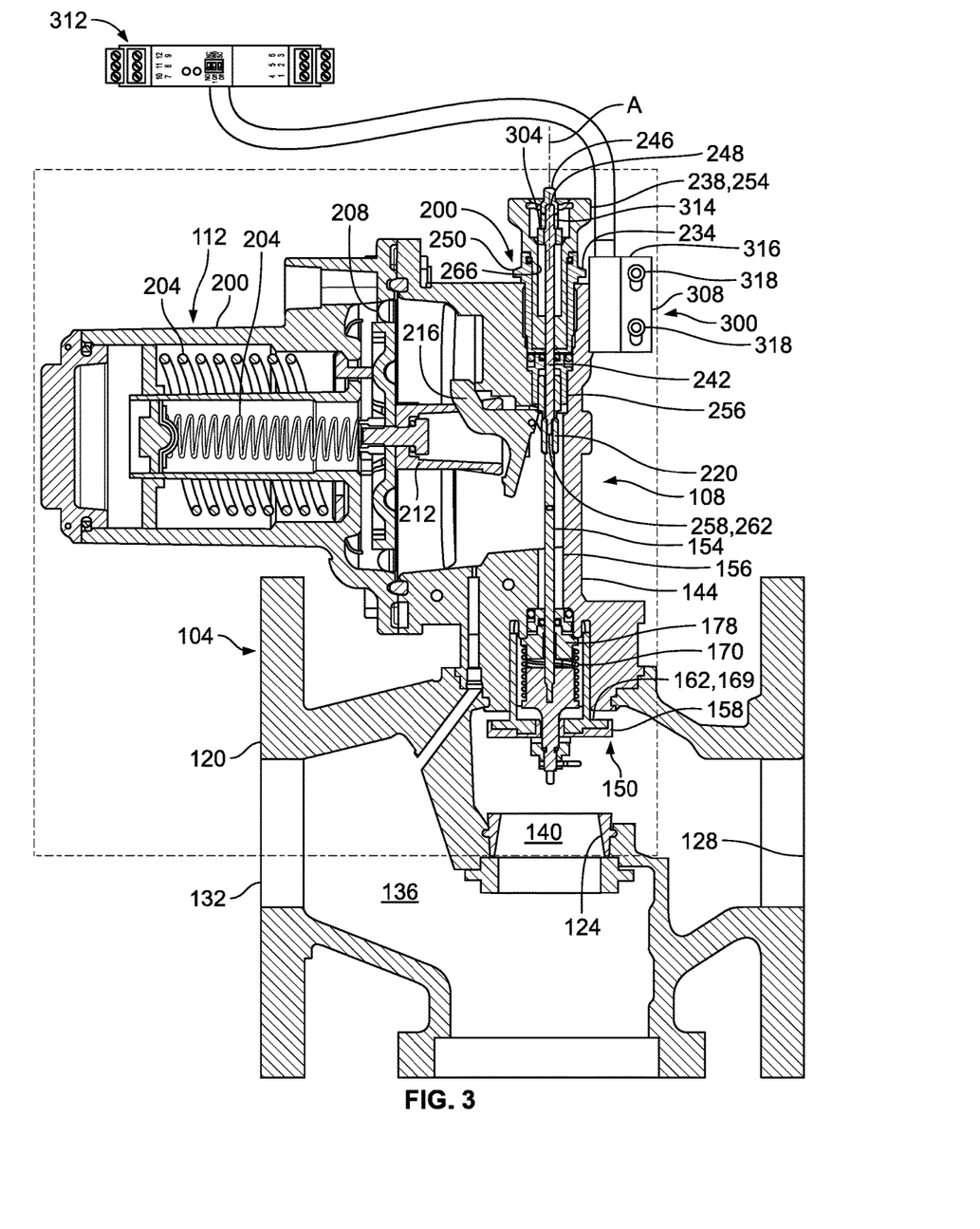
FIG. 3 is a cross-sectional view of the slam-shut safety device of FIG. 1, showing a valve disc and reset pin of the slam-shut safety device in an open position.
Figure 4:
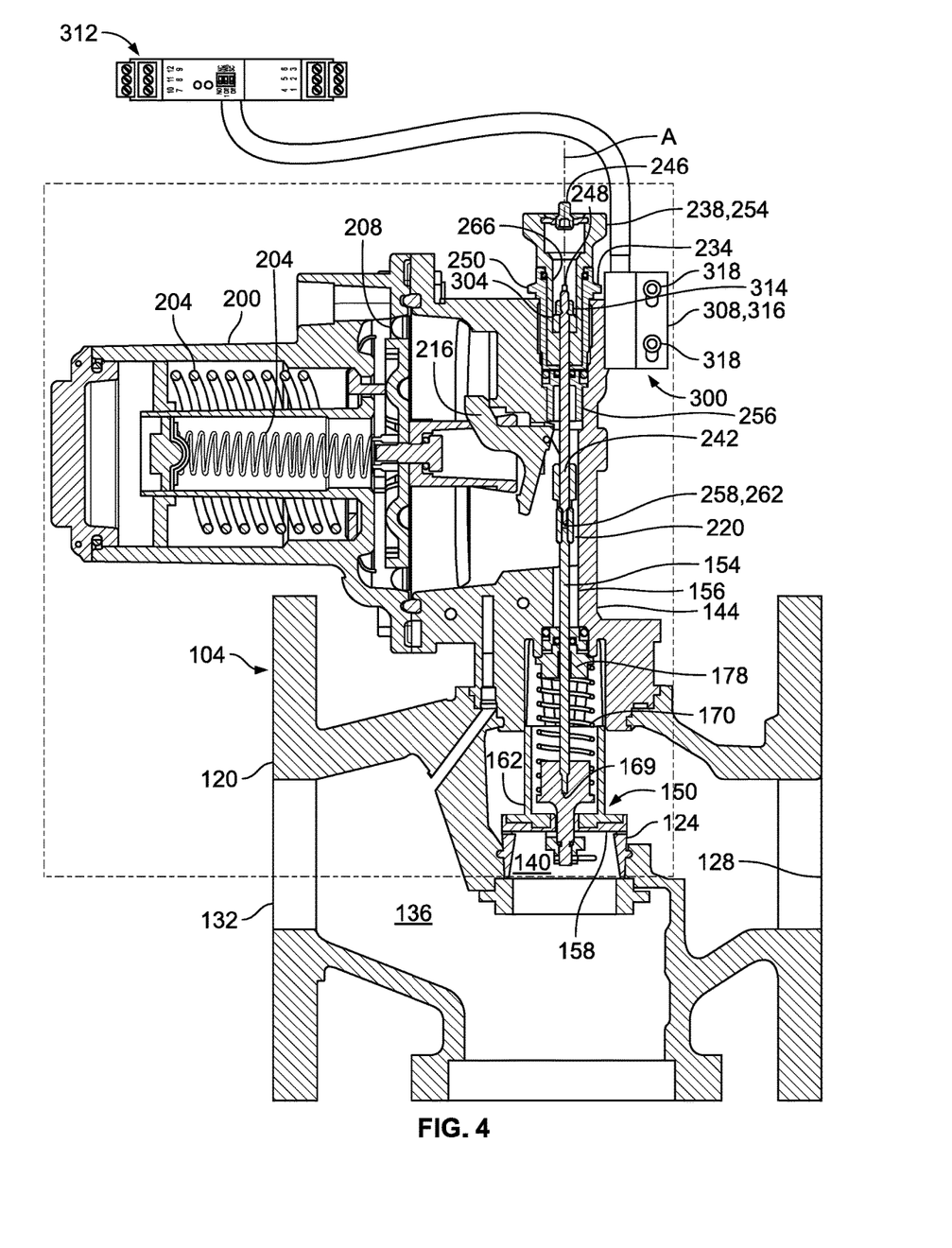
FIG. 4 is similar to FIG. 3, but shows the valve disc and the reset pin in a closed position.

Referring to FIGS. 3 and 4, the valve portion 104 includes a valve body 120 and a slam-shut valve seat 124. The valve body 120 has a fluid inlet 128 and a fluid outlet 132 connected by a fluid passage forming a flow path 136. The slam-shut valve seat 124 is disposed within the valve body 120 and defines a flow orifice 140 that forms a portion of the flow path 136. The slam-shut valve seat 124 may be removably or fixedly disposed in position within the valve body 120. It will be appreciated that fluid flowing through the valve portion 104 flows from the fluid inlet 128 to the fluid outlet 132 via or through the flow path 136 (including the flow orifice 140).

Referring still FIGS. 3 and 4, the slam-shut portion 108 includes a slam-shut body 144, a valve disc assembly 150, and a reset pin 154 that is coupled to the valve disc assembly 150 and slidably disposed in a first bore 156 of the slam-shut body 144. The valve disc assembly 150 generally includes a valve disc 158 and a valve disc support 162 coupled (e.g., attached) to the valve disc 158 such that the valve disc support 162 moves in unison with the valve disc 158 (and vice-versa). When the slam-shut safety device 100 is in operation, the valve disc 158 and the valve disc support 162 are movable relative to the slam-shut valve seat 124 and the slam-shut body 144 to control fluid flow through the valve body 120. More particularly, the valve disc 158 and the valve disc support 162 are movable within the valve body 120 between a first position, shown in FIG. 3, and a second position, shown in FIG. 4. In the first position, the valve disc 158 is spaced from the slam-shut valve seat 124, thereby opening the fluid orifice 140 and allowing fluid flow between the fluid inlet 128 and the fluid outlet 132. In the second position, the valve disc 158 is positioned in sealing engagement with the slam-shut valve seat 124, thereby closing the fluid orifice 140 and preventing fluid flow between the fluid inlet 128 and the fluid outlet 132.

The reset pin 154 is operatively connected to the valve disc 158 via the valve disc support 162. More particularly, the reset pin 154 has a first end 166 that is coupled to the valve disc support 162. In one example, illustrated in FIGS. 3 and 4, the first end 166 of the reset pin 154 is securely disposed within an aperture 169 formed in the valve disc support 162. In other examples, however, the first end 166 may be coupled to the valve disc support 162 in another manner. In any case, the reset pin 154 moves together with the valve disc assembly 150 along a slam-shut axis A relative to the valve body 120 between a retracted or un-tripped position, also shown in FIG. 3, in which the valve disc assembly 150 is in its first position (and the valve disc 158 is spaced from the slam-shut valve seat 124), and an extended or tripped position, also shown in FIG. 4, in which the valve disc assembly 150 is in its second position (and the valve disc 158 is seated against the slam-shut valve seat 124).

The slam-shut portion 108 also includes a biasing element 170. The biasing element 170, which in this example takes the form of a spring, is positioned to apply a biasing force to the valve disc 158 in order to urge the valve disc 158 and the valve disc support 162 toward the second position. In this example, the biasing element 170 has one end that bears against a portion of the valve disc support 162 and another end that bears against a spring seat 178 that is fixed within the slam-shut body 144 and surrounds the reset pin 154.

With continued reference to FIGS. 3 and 4, the actuator 112 includes a housing 200 that encloses one or more springs 204 connected to a diaphragm 208. The diaphragm 208 is sensitive to pressure changes and generally moves within the actuator housing 200 (right or leftward in FIGS. 3 and 4) in response to those pressure changes. The actuator 112 also includes a plunger 212 connected to the diaphragm 208 and moves within the housing 200 in conjunction with the diaphragm 208. The plunger 212 is operatively connected to a cam 216, which releasably engages a connection ring 220 carried by the reset pin 154, thereby releasably retaining the reset pin 154 in the un-tripped position, as illustrated in FIG. 3.

When, for example, the diaphragm 208 senses an overpressure condition or an under pressure condition downstream of the main regulator (which may indicate that the main regulator has failed), the slam-shut safety device 100 will close, thereby providing shutoff. More specifically, when the diaphragm 208 senses an overpressure condition or an under pressure condition, the diaphragm 208 moves (to the right in FIG. 3), which thus causes the plunger 212 to move (to the right as well). The plunger 212 engages the cam 216 so as to cause the cam 216 to rotate (in a counterclockwise direction in FIG. 3) and release the connection ring 220 carried by the reset pin 154, thereby allowing the reset pin 154 to move from its un-tripped position shown in FIG. 3 to the tripped position shown in FIG. 4. It will be appreciated that the biasing element 170 helps to move the reset pin 154 from its un-tripped position to its tripped position. As the reset pin 154 moves from the un-tripped position to the tripped position, the valve disc 158 moves, along the slam-shut axis A, toward and into contact with the slam-shut valve seat 124, thereby closing the flow orifice 140 and shutting off fluid flow through the flow path 136 in the valve body 120.

The slam-shut safety device 100 may also include a reset pin assembly 230 for relatching the cam 216 once the overpressure or under pressure condition has been corrected (and it is desirable to return the reset pin 154 to its un-tripped position and the valve disc assembly 150 to its first position). As best illustrated in FIGS. 3 and 4, the reset pin assembly 230 in this example includes a plug 234, a sleeve 238, a reset rod 242, and an end cap 246.

The plug 234 is coupled to the slam-shut body 144 at a position generally opposite the position of the biasing element 170. The sleeve 238 is coupled to the plug 234 such that the sleeve 238 is positioned to receive and support an end 248 of the reset rod 242. As illustrated, the sleeve 238 in this example has a first portion 250 disposed within the plug 234 (and the slam-shut body 144) and a second portion 254 that is partially disposed within and partially disposed outside of the plug 234 and the slam-shut body 144. The reset rod 242 is disposed in a second bore 256 of the slam-shut body 144 and is operatively connected to the reset pin 154 via the connection ring 220. More particularly, the reset rod 242 has an end 258, opposite the end 248, that is positioned adjacent or against a second end 262 of the reset pin 154 within the connection ring 220. In other examples, however, the reset rod 242 can be integrally formed with the reset pin 154 or connected to the reset pin 154 in a different manner. Additionally, the reset rod 242 is slidably disposed in the plug 234 and the sleeve 238, with the reset rod 242 extending through the first portion 250 of the sleeve 238 such that the end 248 of the reset rod 242 is movably disposed within a cavity 266 of the second portion 254 of the sleeve 238. The end cap 246 is coupled to the sleeve 238 such that the end cap 246 controls movement of the reset rod 242 by engaging the end 248 of the reset rod 242 when the reset pin 154 is in the un-tripped position. So arranged, the end cap 246 also provides protection from water or other environmental factors by forming a seal between the interior of the sleeve 238 and the external environment, thereby protecting the reset rod 242.

When the overpressure condition or the under pressure condition has been corrected, and shutoff is no longer needed, the slam-shut safety device 100 can be opened. When the diaphragm 208 senses that the overpressure or the under pressure condition has been resolved, the diaphragm 208 moves (to the left in FIG. 4), which thus causes the plunger 212 to move (also to the left) as well. This moves the plunger 212 away from the cam 216 so as to cause the cam 216 to rotate (in a clockwise direction in FIG. 4). Thus, the cam 216 is positioned to again releasably engage the connection ring 220 carried by the reset pin 154 when the reset pin 154 and/or the reset rod 242 is/are manipulated (e.g., by an operator) away from the valve body 120 and back toward the un-tripped position shown in FIG. 3. Manipulation of the reset pin 154 and/or the reset rod 242 will also move the valve disc 158 away from the slam-shut valve seat 124 along the slam-shut axis A, shifting the valve disc assembly 150 from its second position (FIG. 4) back to its first position (FIG. 3).

Throughout operation of the slam-shut safety device 100, an operator of the device 100 may wish to monitor or observe the operational status of the device 100. In other words, the operator of the device 100 may wish to monitor whether the device 100 is or is not providing safety shutoff (i.e., is on or off, respectively) at one point in time or different points in time. To this end, the slam-shut safety device 100 includes a feedback system 300 configured to provide the operator with data indicative of the operational status of the device 100. For example, the feedback system 300 may provide the operator with a visual indication of the operational status of the device 100 (e.g., by emitting light when the device 100 is on, by emitting one type of light when the device 100 is on and another type of light when the device 100 is off) and/or a tactile indication of the operational status of the device 100. The feedback system 300 is generally configured to provide this indication to an operator that is proximate the device 100, though the feedback system 300 can alternatively or additionally be configured to provide this indication to an operator located remotely from the device 100 (e.g., via a remotely located display device).

The feedback system 300 generally includes a magnet, a magnetically-responsive switch that is arranged to selectively respond to the magnetic field produced by the magnet in order to facilitate determination of the operational status of the device 100, and one or more display devices that locally and/or remotely provide (e.g., output) data indicative of the operational status of the device 100. In some cases, the switch only provides a signal when the magnet is detected (and does not do so when the magnet is out of range and not detected). In other cases, the switch provides a first signal when the magnet is detected and a second signal when the magnet is out of range and not detected. The feedback system 300 may also, but need not, include a portable tool (e.g., an isolated safety barrier, a multimeter) or other tool for verifying that the magnetically-responsive switch is operating as intended.

In the illustrated example, the feedback system 300 includes a magnet 304, a magnetically-responsive switch in the form of a reed switch 308, and a portable tool in the form of an isolated safety barrier 312 that is communicatively connected to the reed switch 308 and serves both as an intrinsic safety component (limiting the voltage and current supplied to the reed switch 308, which may be in a hazardous area) and as a localized display device for locally providing data indicative of the operational status of the device 100. While not illustrated, the feedback system 300 may also include one or more remotely located display devices for providing data indicative of the operational status of the device to operators located remotely from the device 100.

As best illustrated in FIGS. 3 and 4, the magnet 304 in this example is a permanent magnet carried by the reset rod 242 at a position proximate the end 248 of the reset rod 242, such that the magnet 304 is movably disposed within the sleeve 238. The magnet 304 may be secured on the reset rod 242 via a fastener 314, as shown in FIGS. 3 and 4, or may be coupled to the reset rod 242 in a different manner. In any case, it will be appreciated that the magnet 304 is movably disposed within the sleeve 238 as the reset pin 154 (to which the reset rod 242 is operatively connected) moves between the un-tripped position shown in FIG. 3 and the tripped position shown in FIG. 4. When the reset pin 154 is in the un-tripped position shown in FIG. 3, the magnet 304 is partially disposed in the first portion 250 of the sleeve 238 and partially disposed in the second portion 254 of the sleeve 238. And when the reset pin 154 is in the tripped position shown in FIG. 4, the magnet 304 is entirely disposed in the first portion 250 of the sleeve 238, such that the magnet 304 is positioned closer to the valve body 120. In both positions, the end cap 246 is positioned to prevent the magnet 304 from being exposed to the external environment (which may damage the magnet 304) and prevent the magnet 304 from being dislodged from the reset rod 242.

In this example, the reed switch 308 that is manufactured by, for example, SECATEC GmbH. The reed switch 308 includes a housing 316, a first reed (not shown) disposed in the housing 316, a second reed (not shown) that is disposed in the housing 316 and is movable relative to the first reed responsive to a magnetic field, and an electrical circuit (also not shown) that is also disposed in the housing 316 and is completed or interrupted depending upon the position of the second reed, as is known in the art.

As illustrated in FIGS. 1-4, the housing 316 of the reed switch is coupled to an exterior surface of the slam-shut body 144 via a plurality of fasteners 318. The housing 316 is thus disposed outside of the slam-shut body 144, but at a position that is proximate the plug 234, the sleeve 238, and the reset rod 242, and, more particularly, the magnet 304 carried by the reset rod 242. Thus, the reed switch 308 is arranged to detect and respond to the magnetic field produced by the magnet 304 when the reset pin 154 is in the tripped position and the magnet 304 is positioned as shown in FIG. 4, but does not detect and does not respond to the magnetic field produced by the magnet 304 when the reset pin 154 is in the un-tripped position and the magnet 304 is positioned as shown in FIG. 3. In other words, when the reset pin 154 is in the tripped position (FIG. 4), the reed switch and the magnet 304 are separated by a first distance that allows the reed switch to detect the magnetic field of the magnet 104, but when the reset pin 154 is in the un-tripped position (FIG. 3), the reed switch and the magnet 304 are separated by a second distance that is greater than first distance and is sufficient to magnetically isolate the reed switch 308 from the magnetic field of the magnet 304.

Figure 5:
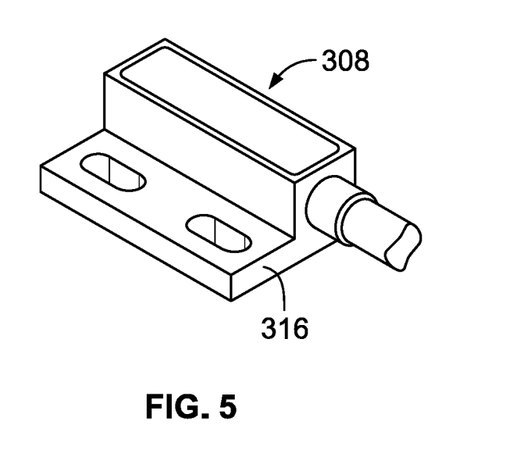
FIG. 5 is a perspective view of one example of a magnetically-responsive switch that can be utilized in the feedback system.
Figure 6:
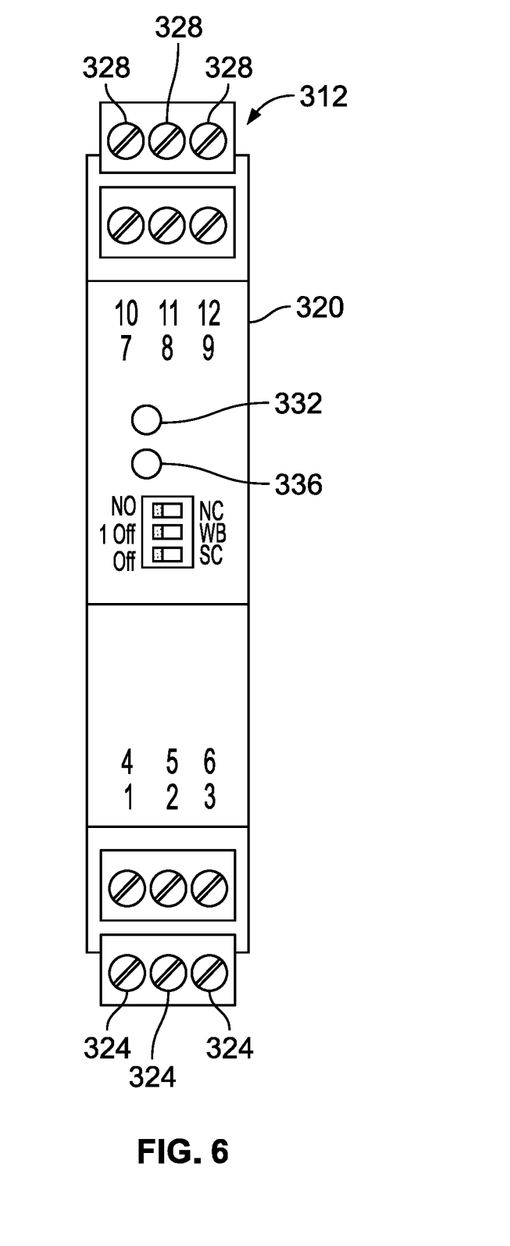
FIG. 6 is a top view of one example of an isolation safety barrier that can be utilized in the feedback system to limit current supplied to the magnetically-responsive switch and provide data indicative of the operational status of the slam-shut safety device.

As best illustrated in FIG. 5, the intrinsic safety barrier 312 in this example is an isolation switching amplifier that is manufactured by, for example, TURCK, and has a housing 320 including a plurality of inputs 324, a plurality of outputs 328, a first light-emitting diode (LED) indicator 332 and a second light-emitting diode (LED) indicator 336. The intrinsic safety barrier 312 is communicatively connected to the reed switch 308 in a known manner via the inputs 324 and outputs 328 The first LED indicator 332 is configured to emit light when the intrinsic safety barrier 312 is supplied with power. The second LED indicator 336 is configured to emit light when current is flowing to/from the safety barrier 312 from/to the reed switch 308 via the inputs 324 and the outputs 328, which is indicative of the electrical circuit of the reed switch 308 being completed. Conversely, the second LED indicator 336 does not emit light when current is not flowing to/from the safety barrier 312 from/to the reed switch 308, which is indicative of the electrical circuit of the reed switch 308 being interrupted.

In operation, in this example, the safety barrier 312 outputs data (in this case, light or no light) indicative of whether current is flowing through the reed switch 308, which is itself indicative of whether the reed switch 308 has or has not detected the presence of the magnetic field produced by the magnet 304, and which is itself indicative of whether the reset pin 154 is in the un-tripped position (FIG. 3) or the tripped position (FIG. 4), all of which is generally indicative of whether the device 100 is open (i.e., not providing a shutoff capability) or closed (i.e., providing shutoff). The operator of the device 100 can, in turn, quickly and safely determine the operational status of the device 100 based upon the data output by the safety barrier 312.

When, for example, the reset pin 154 is in the un-tripped position shown in FIG. 3 (which corresponds to the valve disc assembly 150 being in the open position), the magnet 304 is separated from the reed switch 308 by the first distance. So positioned, the reed switch 308 is unable to detect the presence of the magnetic field produced by the magnet 304 (i.e., the magnetic field is out of the detection range of the reed switch 308). As such, the second reed of the reed switch 308 is positioned apart from the first reed of the reed switch 308, such that the electrical circuit of the reed switch 308 is interrupted (i.e., not completed). In turn, no current flows between the reed switch 308 and the safety barrier 312, such that the second LED indicator 336 does not emit any light. This provides a visual indication to the operator of the device 100 that the device 100 is open and is not providing any shutoff to the rest of the system.

On the other hand, when the reset pin 154 is in the tripped position shown in FIG. 4 (which corresponds to the valve disc assembly 150 being in the closed position), the magnet 304 is separated from the reed switch 308 by the second distance (less than the first distance discussed in the preceding paragraph). So positioned, the reed switch 308 detects the presence of the magnetic field produced by the magnet 304 (i.e., the magnetic field is in the detection range of the reed switch 308). As such, the second reed of the reed switch 308 moves toward and into contact with the first reed of the reed switch 308, thereby completing the electrical circuit of the reed switch 308. In turn, current flows between the reed switch 308 and the safety barrier 312, such that the second LED indicator 336 emits light. This provides a visual indication to the operator of the device 100 that the device 100 is providing shutoff (i.e., is closed).

It will thus be appreciated that the reed switch 308 is triggered or actuated when the reset pin 154 is moved from the un-tripped position (FIG. 3) to the tripped position (FIG. 4), which corresponds to movement of the valve disc assembly 150 from its open position to its closed position. This is because movement in this manner causes the magnet 304 to move closer to the reed switch 308, so that the second reed of the reed switch 308 detects the presence of the magnetic field produced by the magnet 304, which causes the second reed of the reed switch 308 to move toward and into contact with the first reed of the reed switch 308, completing the electrical circuit in the reed switch 308.

In other examples, the feedback system 300 can vary and yet still perform the intended functionality. In some examples, the feedback system 300 may include more than one magnet. In some examples, the switch 308 may instead take the form of a hall-effect sensor (which provides a voltage that varies in response to the presence or lack of magnetic field) or other magnetically-responsive switch. In some examples, the switch 308 may itself provide the data indicative of the operational status of the device 100. In one such example, the switch 308 may include an LED indicator that emits (or does not emit) light based upon the operational status of the device 100. Other variations are possible and envisioned as well.

Each of the optional arrangements described herein may be arranged in any set of combinations or permutations sufficient to provide any combination of one or more functionalities suggested by the description provided herein. Further, it is understood that each of the features disclosed with respect to each exemplary arrangement may be combined in any functional combination, such as to provide any useful combination of functionalities as would be understood by a person of ordinary skill.

While certain representative arrangements of slam-shut devices and details have been described herein for purposes of illustrating the invention, it will be apparent to those skilled in the art that various changes in the devices disclosed may be made without departing from the spirit and scope of the invention, which is defined by the following claims and is not limited in any manner by the foregoing description.

What is claimed is:

1. An assembly for a slam-shut safety device, the assembly comprising:
a reset pin;
a valve disc operatively connected to the reset pin, the reset pin and the valve disc being movable between a first position, in which the valve disc is adapted to be spaced from a slam-shut valve seat of the slam-shut safety device, and a second position, in which the valve disc is adapted to engage a slam-shut valve seat of the slam-shut safety device;
a reset pin assembly comprising a reset rod and a reset sleeve, the reset rod operatively connected to the reset pin, and the reset sleeve arranged to support an end of the reset rod; and
a feedback system arranged proximate the reset pin assembly and configured to provide data indicative of whether the reset pin and the valve disc are in the first position or the second position, the feedback system comprising:
a magnet carried by the reset rod; and
a magnetically-responsive switch arranged proximate the reset sleeve such that the magnetically-responsive switch detects the magnet when the reset pin and the valve disc are in the first position but does not detect the magnet when the reset pin and the valve disc are in the second position.

2. The assembly of claim 1, wherein the feedback system further comprises a display device communicatively coupled to the magnetically-responsive switch, the display device configured to provide the data indicative of whether the reset pin and the valve disc are in the first position or the second position.

3. The assembly of claim 1, wherein the feedback system further comprises an intrinsically safe barrier communicatively coupled to the magnetically-responsive switch, the intrinsically safe barrier configured to provide the data indicative of whether the reset pin and the valve disc are in the first position or the second position.

4. The assembly of claim 3, wherein the intrinsically safe barrier is configured to emit light when the reset pin and the valve disc are in the first position, but not emit light when the reset pin and the valve disc are in the second position.

5. The assembly of claim 1, further comprising a fastener that secures the magnet to the reset rod proximate the end of the reset rod.

6. The assembly of claim 1, wherein when the reset pin and the valve disc are in the first position, the magnet and the magnetically-responsive switch are separated by a first distance, and wherein when the reset pin and the valve disc are in the second position, the magnet and the magnetically-responsive switch are separated by a second distance less than the first distance.

7. The assembly of claim 1, wherein the magnetically-responsive switch comprises a reed switch.

8. The assembly of claim 7, wherein the reed switch comprises a first reed, a second reed movable relative to the first reed responsive to movement of the magnet, and an electronic circuit that is completed or interrupted based upon the position of the second reed.

9. The assembly of claim 8, wherein when the reset pin and the valve disc are in the first position, the second reed is spaced from the first reed, thereby interrupting the electrical circuit.

10. The assembly of claim 9, wherein when the reset pin and the valve disc move from the first position to the second position, the magnetic field of the magnet causes the flexible reed to move toward and contact the second reed, thereby completing the electrical circuit.

11. An assembly for a slam-shut safety device, the assembly comprising:
a reset pin;
a valve disc operatively connected to the reset pin, the reset pin and the valve disc being movable between a first position, in which the valve disc is adapted to be spaced from a slam-shut valve seat of the slam-shut safety device, and a second position, in which the valve disc is adapted to engage the slam-shut valve seat of the slam-shut safety device;

a reset pin assembly comprising a reset rod and a reset sleeve, the reset rod operatively connected to the reset pin, and the reset sleeve arranged to support an end of the reset rod; and a feedback system arranged proximate the reset pin assembly and configured to provide data indicative of whether the reset pin and the valve disc are in the first position or the second position, the feedback system comprising:

a magnet coupled to the reset pin proximate to the end of the reset pin, the magnet being movably disposed in the reset sleeve between a third position when the reset pin and the valve disc are in the first position and a fourth position when the reset pin and the valve disc are in the second position; and a magnetically-responsive switch arranged proximate to the reset sleeve, wherein movement of the magnet from the third position to the fourth position actuates the magnetically-responsive switch.

12. The assembly of claim 11, wherein the feedback system further comprises an intrinsically safe barrier communicatively coupled to the magnetically-responsive switch, the intrinsically safe barrier configured to provide the data indicative of whether the reset pin and the valve disc are in the first position or the second position.

13. The assembly of claim 12, wherein the intrinsically safe barrier is configured to emit light when the reset pin and the valve disc are in the first position, but not emit light when the reset pin and the valve disc are in the second position.

14. The assembly of claim 11, further comprising a fastener that secures the magnet to the reset rod proximate the end of the reset rod.

15. The assembly of claim 11, wherein when the reset pin and the valve disc are in the first position, the magnet and the magnetically-responsive switch are separated by a first distance, and wherein when the reset pin and the valve disc are in the second position, the magnet and the magnetically-responsive switch are separated by a second distance less than the first distance.

16. The assembly of claim 11, wherein the magnetically-responsive switch comprises a reed switch, the reed switch comprising a first reed, a second reed movable relative to the first reed responsive to movement of the magnet, and an electronic circuit that is completed or interrupted based upon the position of the second reed.

17. The assembly of claim 16, wherein when the reset pin and the valve disc are in the first position, the second reed is spaced from the first reed, thereby interrupting the electrical circuit, and wherein when the reset pin and the valve disc move from the first position to the second position, the magnetic field of the magnet causes the flexible reed to move toward and contact the second reed, thereby completing the electrical circuit.

18. A slam-shut safety device, comprising:

a valve body having an inlet, an outlet, and defining a flow path extending between the inlet and the outlet, the valve body including a slam-shut valve seat surrounding an orifice disposed between the inlet and the outlet;

a valve disc disposed within the valve body and shiftable along a slam-shut axis between an open first position in which the valve disc is spaced away from the slam-shut valve seat, and a closed second position in which the valve disc is seated against the slam-shut valve seat;

a reset pin operatively coupled to the valve disc and shiftable along the slam-shut axis relative to the valve body between an un-tripped position placing the valve disc in the open first position and a tripped position placing the valve disc in the closed second position, the reset pin arranged to respond to an actuator of the slam-shut safety device to shift the reset pin from the un-tripped position toward the tripped position;

a reset pin assembly comprising a reset rod and a reset sleeve, the reset rod operatively connected to the reset pin, and the reset sleeve arranged to support an end of the reset rod; and a feedback system arranged proximate the reset pin assembly and configured to provide data indicative of whether the reset pin and the valve disc are in the first position or the second position, the feedback system comprising:

a magnet carried by the reset rod; and a magnetically-responsive switch arranged proximate the reset sleeve such that the magnetically-responsive switch detects the magnet when the reset pin and the valve disc are in the first position but does not detect the magnet when the reset pin and the valve disc are in the second position.

19. The slam-shut safety device of claim 18, wherein the feedback system further comprises an intrinsically safe barrier communicatively coupled to the magnetically-responsive switch, the intrinsically safe barrier configured to provide the data indicative of whether the reset pin and the valve disc are in the first position or the second position.

20. The slam-shut safety device of claim 18, further comprising a slam-shut body, the reset pin and the reset rod movably disposed in first and second bores, respectively, of the slam-shut body, wherein the magnetically-responsive switch comprises a housing coupled to the slam-shut body proximate the end of the reset rod.

* * * * *

UNITED STATES PATENT AND TRADEMARK OFFICE
CERTIFICATE OF CORRECTION

PATENT NO.         : 10,443,749 B2
APPLICATION NO.    : 15/957545
DATED              : October 15, 2019
INVENTOR(S)        : Jing Zhang et al.

It is certified that error appears in the above-identified patent and that said Letters Patent is hereby corrected as shown below:

In the Specification

At Column 3, Line 52, "position; and" should be -- position; --.

At Column 3, Line 54, "position." should be -- position; --.

At Column 3, Line 57, "system." should be -- system; and --.

At Column 4, Line 12, "example" should be -- example of --.

At Column 8, Line 13, "magnet 104," should be -- magnet 304, --.

At Column 8, Line 26, "328" should be -- 328. --.

Signed and Sealed this
Third Day of November, 2020

Andrei Iancu
*Director of the United States Patent and Trademark Office*